United States Patent Office 3,526,575
Patented Sept. 1, 1970

3,526,575
PRODUCTION AND UTILIZATION OF HIGH DENSITY PLASMA
Willard H. Bennett, 5500 N. Hills Drive, Raleigh, N.C. 27609
Filed Aug. 2, 1967, Ser. No. 657,986
Int. Cl. G21b 1/02; G21g 1/02
U.S. Cl. 176—1                                                15 Claims

ABSTRACT OF THE DISCLOSURE

The disclosure relates to apparatus for producing pulsed beams of relativistic electrons which, by means of linear pinch techniques, are focused down to less than 2 mm. diameter and preferably less than 1 mm., thereby making possible the generation of an extremely high power density on a selected target. The disclosure is also concerned with apparatus providing for the impingement of such beams of high power density upon targets which are adapted to make possible the production of thermonuclear fusion power and the production of transuranic elements in more than microgram quantities.

BACKGROUND OF THE INVENTION

Using a recently developed new kind of machine, 3.5 mev. electrons in 30,000 ampere 30 nanosecond pulses have been projected in pulsed beams diverging at a half-angle of 10° through a 3 cm. diameter area of a 0.05 mm. metal foil into and around the end of a 50,000 ampere linear pinched discharge in argon. The self-magnetic field of the linear pinch pulls the relativistic beam down and delivers the 3000 joules of pulsed energy to a 0.6 cm. diameter spot on a metal target on the far end of the pinch tube at distances of more than 160 cm. Using the same kind of techniques, the pulsed relativistic beams have been guided around corners at a radius of 15 cm. The reverse current induced in the ionized linear pinch column by the passage of the relativistic pulse is equal or nearly equal and opposite to the injected current as anticipated theoretically. The reduction in radius found also agrees with theory and this points the way to methods which can be used for increasing the power density by orders of magnitude using these methods.

The diverging pulsed beams of electrons may be projected through thin sheets of metal into the end of a 10 cm. diameter glass pipe discharge tube in which a low voltage (8–10 kev.) linear pinched discharge less than 1 cm. in diameter in argon gas has been produced. Although most of the intense pulse of 3.5 mev. electrons emerges through the thin metal sheet outside of the end of the linear pinched discharge, the self-magnetic field of the linear pinch turns the 3.5 mev. electrons inwardly and focuses them to a smaller diameter inside of the linear pinched discharge. The resulting pinch of the injected relativistic pulse is just that which is anticipated in theory.

Two independent methods may be used in making measurements of the change in current produced in the linear pinched discharge by injecting an intense high voltage electron pulse into it. In one, a Rogowski coil is used around the discharge tube. In the other method, the change in the potential drop along the linear pinch is measured using a potential divider. Both measurements showed a negligibly small change in total current in the linear pinch tube when the high voltage discharge occurred. The smallness of the signal observed in both of the measurements shows that there must be a return current induced in the plasma which is equal or very nearly equal, and opposite to the injected beam current so that there is very little if any increase in the total current in the linear pinch tube. This is also in agreement with theoretical predictions for the induced reverse currents for such short intense pulses as these.

Now that the predicted induced reverse currents have been confirmed experimentally, it can further be pointed out that the application of the continuity equation to the injected and reverse current densities shows that the space charge of the injected beam is precisely neutralized by the divergence of the current induced in the linear pinch plasma so that the space charge of the injected beam remains precisely neutralized automatically.

In addition to the above work, experiments have also been completed using a low voltage pinch in a 10 cm. diameter glass pipe in the form of a right-angle elbow so that the pinch discharge is forced around a bend 15 cm. in radius. This curved pinch draws in the relativistic pulse just as before, and guides the entire injected relativistic beam around the bend, delivering it in an even better focused form at the target than in the straight pinch tube. The severe blow-back of material exploded out of the target which in the straight tube always severely ruptured the thin metal sheet, in the case of the bent tube mostly struck the glass pipe elbow harmlessly with only a little of the "blow-back" bouncing on to the thin metal sheet around the bend.

Because the observations fit the established theory so well, it follows that the development of methods for injecting the intense electron pulses through the thin sheet into the linear pinch in diameters less than 5 mm. and at mean angles of divergence at less than 3°, will enable the linear pinch to focus the intense pulsed stream down to less than 1 mm. diameter. If this is done with the larger similar kind of machine which has already been built and which will deliver 70 nanosecond pulses of 250,000 amperes at more than 10 mev., the power density at the target is more than $3.10^{13}$ watts cm.$^{-2}$ and the energy delivered to this tiny target is 175,000 joules.

This opens up several interesting new developments, including: (1) the production of transuranic elements in more than microgram quantities; (2) the production of thermonuclear fusion power in pulsed processes so fast and in material of such high density that bremsstrahlung losses no longer make the process uneconomical; (3) the production of thermonuclear fusion power by stacking the relativistic beam in a loop which collapses in minor radius indefinitely and produces fusion of the ambient deuterium fuel while doing so; and (4) the production of plasma at solid state densities and stellar temperatures with which to investigate the physics of the interior of stars and other matters of fundamental interest.

According to the present invention, there are disclosed herein several embodiments of apparatus which are adapted to make possible these various developments.

SUMMARY OF THE INVENTION

The present invention relates to method and apparatus for generating a pulsed electron beam of relativistic electrons having exceptionally high pulse density, and for causing such a beam to impinge upon a target which, in accordance with one embodiment of the invention, makes possible the production of high density plasmas. A particular application includes the production of transuranic elements in greater than microgram quantities. Such elements are of use as nuclear fuels, as radioactive tracer elements, and as radiation sources for the irradiation of various materials.

DESCRIPTION OF THE PREFERRED EMBODIMENT

Figure 1:
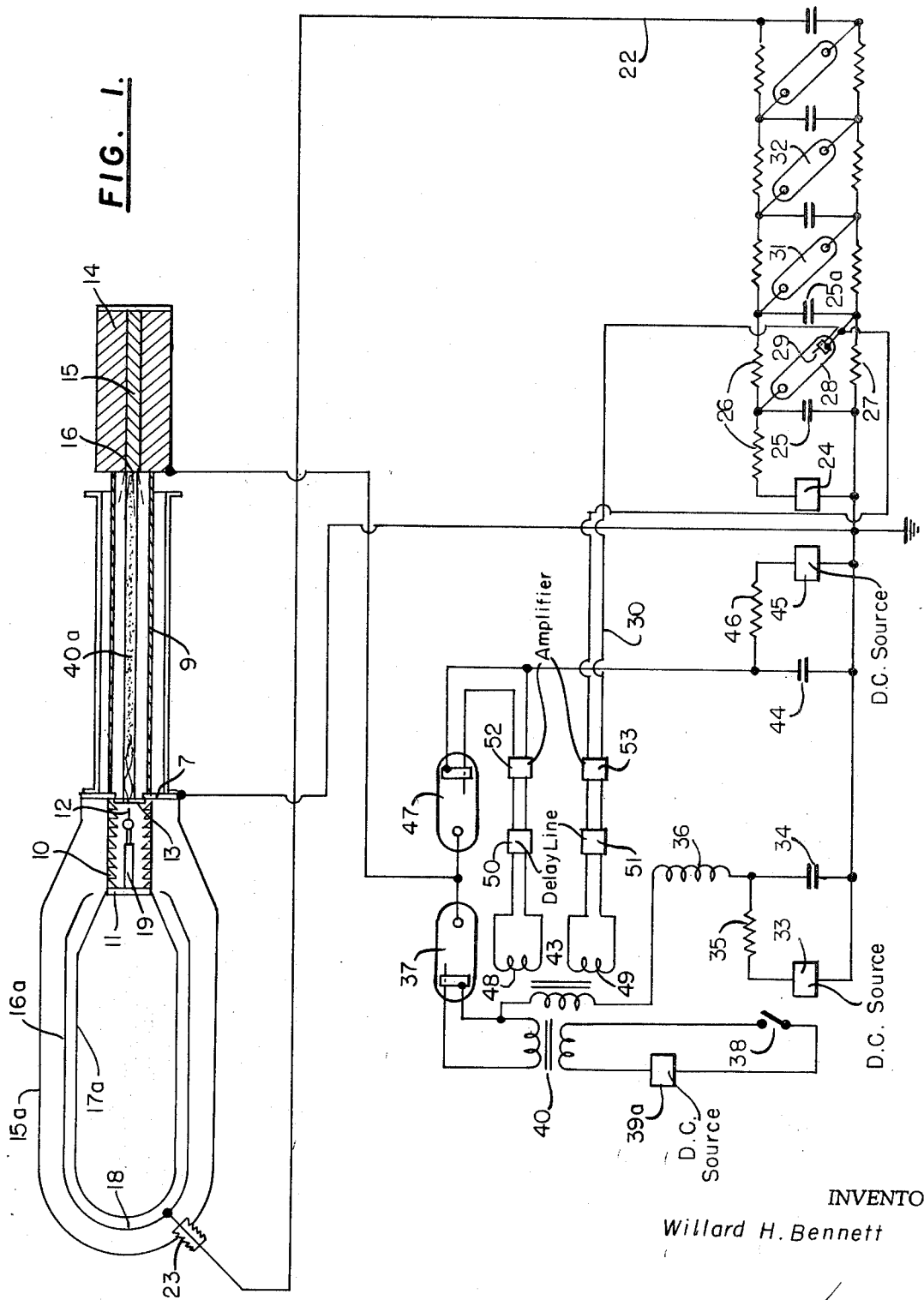
FIG. 1 diagrammatically illustrates apparatus for the production of a pulsed beam of electrons of high power density and the impingement of such a beam upon a target capable of production of high density plasmas.

The apparatus shown in FIG. 1 for producing the linear pinched electron discharge comprises a high voltage tube including a high voltage terminal 11, and a field emission cathode 12. A thin metal sheet 13 forms the cathode of a linear pinched discharge and also acts as the anode of a very intense pulsed field emission discharge. The pinch tube 9 may be formed of glass or of a suitable high temperature ceramic material or the like. Operation of this portion of the apparatus of FIG. 1 is more fully disclosed and its operation explained in my copending U.S. application Ser. No. 597,392, filed Nov. 28, 1966.

The linear pinched discharge will be called the linear pinch and the intense pulsed discharge will be called the injected beam. The field emission discharge is injected through the thin metal sheet into and around the end of the linear pinch and is focused by the self-magnetic field of the linear pinch. Immediately upon injection of the high energy beam into the conducting channel provided by the linear pinch, there is an induced reverse current mixed with the injected beam which is very nearly equal in magnitude to the injected current.

Transuranic production

The target for the beam comprises, in FIG. 1, a cylindrical member of uranium or other element of high atomic number 14 which may have any diameter and any length and having a hole 15 on axis of any diameter up to about 1 cm. which is filled with a material including deuterium such as a compound of deuterium with other elements of low atomic number such as lithium and boron and carbon. The end may be capped with a thin metal sheet 16.

Because of the extremely high density of the pulsed electron beams, most of the energy of the beam is deposited at much less than the range of such electrons as usually calculated and is in accord with some recent unpublished Monte Carlo calculations.

If now a 250,000 ampere pulse of 10 mev. electrons is delivered in a 0.3 mm. beam into the above target on axis in which the material including deuterium has a density of 9 gm. cm.$^{-3}$ and in which most of the energy will be deposited in the first 1.5 cm., the temperature will rise until the input power density approaches the power density loss by bremsstrahlung, which gives $T=5.3$ kev. When the target begins to expand, the same mass per unit area, approximately, received the energy but the *reduction* in plasma density *increases* the temperature according to the fourth power of the density change factor. A 50 percent expansion of the target should increase the temperature to more than 25 kev.

For example, the temperature and other conditions which will be produced in the channel are just those which will drive the thermonuclear fusion of the deuterium and produce one neutron for every two deuterons or about $3.3.10^{19}$ neutrons per pulse plus whatever additional neutrons may result from this additional energy driving additional fusion in the surrounding material. This is a very rapid production of neutrons at nearly solid state densities and therefore is ideal for driving the nearby heavy metal to transuranic production.

Production of thermonuclear fusion power

In order to employ FIG. 1 to develop thermonuclear fusion power using solid deuterium including targets, the surrounding material of high atomic number is not used; instead, the target then comprises either solid deuterium or deuterium compounds in combination with such moderators as lithium blankets, et cetera, as would be found appropriate to optimize the conditions for efficient power production. More specifically, the target comprises a cylindrical member 15 formed of solid deuterium or material including deuterium and an element or elements of an atomic number of six or less. As soon as the temperature has risen to 6.4 kev. due to expansion in the target, the fusion becomes self-sustaining until the target has expanded too much to sustain the required temperature.

Referring to FIG. 1, inside of a tank 15a there are suspended two coaxial cylindrical electrodes 16a and 17a. The rounded caps on 16a and 17a are held much closer to each other at the gap 18 than the distance elsewhere between 16a and 17a.

At the other end of the inner electrode 17a is a high voltage electrode 11 which is supported on an insulated bushing 10. All of the tank except the inside of the bushing 10 is filled with an insulator such as oil, or other insulating fluid or gas. The inside of the bushing is evacuated to pressures less than $\frac{1}{10}$ micron by means of suitable vacuum pumps.

The intermediate electrode 16a is charged to a high voltage through a wire connected at 22 which extends through bushing 23 in the wall 15a. This wire is connected to a source of high voltage shown in the lower part of FIG. 1 and may be constructed in any of many ways familiar to those skilled in the art.

In FIG. 1, a power supply 33 is used for charging a condenser 34, through a resistor 35. The condenser is connected through an inductance 36, and a transformer 43, to a triggered gap or thyratron or other high voltage valve 37. The device at 37 is triggered by closing the switch 38, which connects the high voltage from the power supply 39a to the transformer 40. This applies a potential to the target 16 of the pinch tube 9 for the purpose described in the next paragraph.

The magnitude of the inductance 36 is selected to slow down the discharge in the pinch tube 9, enough to produce ionization throughout the tube but not to pinch down the discharge within less than about 10 to 100 miscroseconds if at all. This is called a pre-ionization and assists in readying the conditions inside of the pinch tube 9, so that when the condenser 44 is connected across the tube, a well-formed pinch will form promptly, i.e., within less than about 5 microseconds.

The power supply 45 charges the condenser 44 through the resistor 46. The condenser is connected to the triggered gap or other valve 47, to apply high voltage in a stepper pulse which causes the gas in tube 9 to ionize and pinch down to an ionized column 40a.

The transformer 43 has two secondary windings 48 and 49. The output from winding 48 is connected through a delay line 50 to the amplifier 52, which is connected to the triggering device 47. The other winding 49 is connected through a delay line 51, to an amplifier 53, which is connected to the triggering device 28, which fires the high energy machine.

The delay in either 50 or 51 is set so that the high energy electron pulse from cathode 12 is produced just before the pinch at 40a has drawn down to its minimum diameter of ionized column. For most dimensions of the parts of the machines and values of the electrical constants in the various parts of the complete equipment, the delay in the delay line 51 should be set at zero or this delay line should be removed and the delay in delay line 50 should be set some value less than about 10 microseconds.

The direct current supply 24 of potential of the order of 50,000 or more volts charges a bank of condensers 25, 25A, etc., in parallel through high resistances 26 and 27 which are preferably more than 1,000 ohms each.

In the figure there are only four condensers, 25, 25A, etc., shown together with their associate spark gaps 29, 31, 32, etc., and resistors 26, 27, etc. In actual practice more condensers with associated components must be used, for most applications numbering between 20 and 200 such stages. In the following description it should be understood that a larger number of stages than shown in the figure are to be used.

Shown at 28 is a triggering device which is a spark gap in which the outer one of the electrodes has a hole in it along the axis of the two electrodes. Inside of the hole is held a wire, the end of which is near the opening towards the other electrode. This wire is insulated so that when a high voltage is suddenly applied to it through a wire 30, a small spark will jump from the end of 29 to the surrounding outer electrode. This causes a spark-over of the gap and suddenly connects the high voltage end of the first condenser 25 to the low voltage end of the second condenser 25A and applies a voltage across the next spark gap at 31 which is much greater than the breakdown voltage of that gap. This over-volts the next spark gap at 32 even more and so on, sparking over the next of the spark gaps and suddenly connects all of the condensers 25, 25A etc., in series, applying the total voltage to the intermediate electrode 16a. Instead of the triggered gap described above, a thyratron or any of the high voltage valves familiar in the art may be used.

When the electrode 16a attains a sufficiently high charge by reason of the condensers 25, 25a, etc., being connected thereto, the high voltage discharges across the gap 18 to the electrode 17a, thus resulting in a discharge from the high voltage electrode 19, establishing a concentrated beam of electrons which is projected along the axis of the tube 9, first passing through the diaphragm 13 which is sufficiently thin as to allow the electrons to pass therethrough but yet sufficiently thick to maintain the required vacuum.

Coordinated with this discharge, another discharge is caused to occur between the electrode 16 and the grounded electrode 7 through gas in the tube 9 which is held at a pressure of the order of 0.05 to 10 torrs. This latter discharge which will be referred to as the pinch draws down to an ionized column 40a in the middle of tube 9. The values of components 50–51, 52–53 are so selected as to properly coordinate the two discharges. The coordination just referred to is mainly achieved by proper selection of delay lines 50 and 51 as explained above. Thus, the first thing to occur is the preliminary ionization in tube 9 due to triggering valve 37. The next events are the discharge and the final ionization in tube 9 due to triggering of valve 47 so that the pinch at 40a has drawn down to its optimum at the time of discharge from cathode 12.

As the high voltage electrons enter the pinch, they comprise an increasing electron current and this induces electric fields which tend to produce electron currents in the opposite direction in the vicinity of the high voltage beams. The component of velocity in the reverse direction given to the pinch electrons by the induced electric fields produces a force upon these pinch electrons which is radially outwards due to the interaction of that velocity component with the self-magnetic field of the injected high voltage electron beam. I have described this pinch effect in Physical Review, vol. 90, p. 398, 1953, in a paper entitled "Magnetically Self-Focusing Discharges."

This displacement of pinch electrons radially outwards allows the self-magnetic field of the high voltage beam to pinch that high voltage beam down further and to make this beam deliver energy upon the target electrode 16 in a very much great concentration of power than would have been possible with the divergent beam at 13, if the pinch had not been used.

The self-magnetic field of the pinch also acts as a guide to deliver the concentrated high voltage beam to the target at the middle of the end of the pinch which is at the target electrode 16.

Alternative embodiment for producing pinched electron beam

It is generally observed that the field emission from cold cathodes produced by applying very high voltages in tubes of the kind illustrated in my prior copending patent applications, Ser. No. 569,549 filed July 19, 1966, and Ser. No. 597,392, filed Nov. 28, 1966, is very erratic both in time and also in location of the emitting areas. The emission from the rounded end of a $\frac{1}{16}''$ diameter wire is in the form of small diameter beams which move about very rapidly within a cone of aperture of the order of 30°. This is believed to indicate that the field emission is enhanced wherever a positive ion is approaching the field emitting surface.

Figure 2:
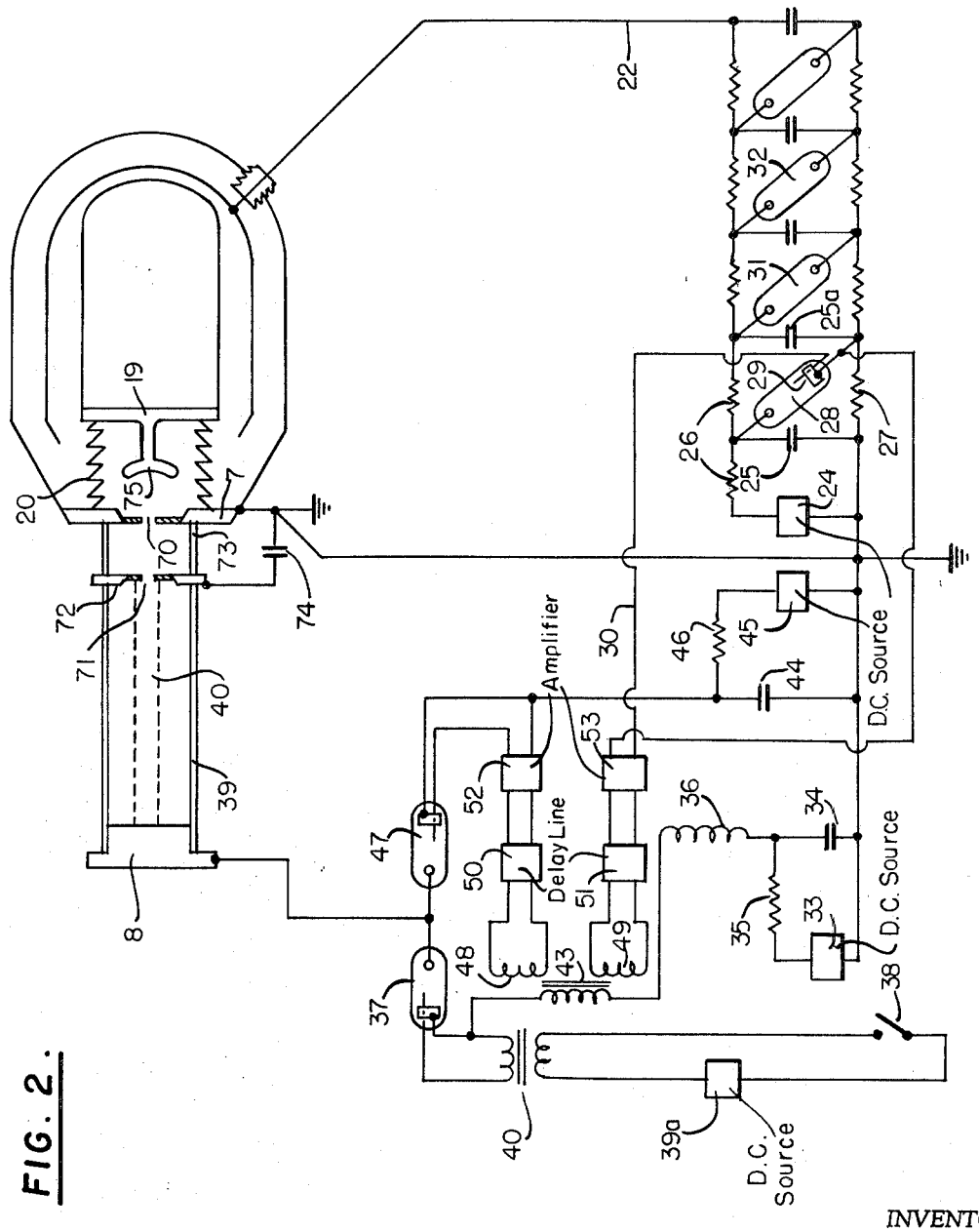
FIG. 2 illustrates an alternative apparatus useful in the production of thermonuclear fusion power.

In order to cause the field emission to be directed within a narrow cone toward the target, it is proposed to use an arrangement such as is shown in FIG. 2 which is a modified form of the apparatus shown in FIG. 1.

Instead of using the rounded end of a wire as the cathode, it is proposed to use a metal surface which may be concave such as illustrated at 75. In front of this cathode are located two thin metal sheets 70 and 71 in each of which there is a small aperture on axis. These sheets are mounted on electrodes 7 and 72 respectively which in turn are separated by a section of glass pipe or other insulating materials 73. Electrode 72 is connected to electrode 7 through a condenser 74.

In operation, the linear pinch discharge is produced between electrode 8 and electrodes 7 and 72 with means previously described. This discharge projects a few positive ions through the aperture in the sheet 71. The potential difference across the condenser 74 produces an electric field between 70 and 71 which accelerates the positive ions towards and through the aperture in 70 and some of these positive ions continue toward the concave surface on the cathode 75. The enhancement of the field emission at 75 produces field emission which is directed in a slightly converging beam of electrons toward and through the thin sheets 70 and 71 into the linear pinch discharge 40 which has been produced inside of the tube 39.

Instead of the condenser 74, a resistor can be used whose resistance is small enough to avoid seriously disturbing the formation of the linear pinch discharge and whose current-carrying capacity is sufficient to withstand the pulsed discharge with which the linear pinch is formed. For example, if a linear pinch current of 50,000 amperes is produced with a condenser discharge at 15 kilovolts, a desirable value of the resistance would be of the order of $\frac{1}{10}$ ohm and the resistance might be made of pieces of boron carbide. However, there are many other variations of material and values of resistance which would be quite satisfactory and would be familiar to those skilled in the art.

The remainder of the apparatus of FIG. 2 is similar to that shown in FIG. 1, and the description given with respect to FIG. 1 applies equally well to the apparatus of FIG. 2.

The term "material including deuterium" as used herein includes deuterium or any compound, alloy, or mixture containing deuterium.

What I claim is:

1. The method of bombarding a target containing a heavy element which is fissionable under neutron bombardment and a compound including deuterium comprising injecting a pulsed beam of electrons into a pinched discharge thereby focusing the beam of electrons on the target, and setting the beam intensity to a sufficiently high value to produce a sufficiently high temperature to fuse the deuterium and cause it to emit neutrons thereby to produce neutron reactions with the heavy element.

2. The method of claim 1 in which the beam is focused on at least part of the compound.

3. The method of bombarding a target containing a heavy element as defined in claim 1 in which said compound consists of deuterium combined with an element selected from the group consisting of lithium, boron and carbon.

4. The method of bombarding a target containing a heavy element as defined in claim 1 in which the compound is lithium deuteride.

5. The method of bombarding a target containing a heavy element as defined in claim 1 in which the compound includes boron.

6. The method of bombarding a target containing a heavy element as defined in claim 1 in which the compound includes carbon.

7. The method of bombarding a target containing a material including deuterium comprising injecting a pulsed beam of electrons into a pinched discharge thereby focusing the beam of electrons on the target, and setting the beam intensity to a sufficiently high value to produce a sufficiently high temperature to fuse the deuterium in the material.

8. The method of bombarding a target as defined in claim 7 in which the material including deuterium is a compound that includes deuterium combined with an element selected from the group consisting of lithium, boron and carbon.

9. The method of bombarding a target as defined in claim 7 in which the material including deuterium is the compound lithium deuteride.

10. The method of bombarding a target as defined in claim 7 in which the material including deuterium is a compound including boron.

11. The method of bombarding a target as defined in claim 7 in which the material including deuterium is a compound including carbon.

12. The method of bombarding a target containing a heavy element which is fissionable under neutron bombardment and a material including deuterium comprising injecting a pulsed beam of electrons into a pinched discharge thereby focusing the beam of electrons on the target, and setting the beam intensity to a sufficiently high value to produce a sufficiently high temperature to fuse deuterium and cause it to emit neutrons thereby to produce neutron reactions with the heavy element.

13. The method of bombarding a target as defined in claim 12 in which the deuteride is a compound that includes deuterium combined with an element selected from the group comprising lithium, boron and carbon.

14. The method of bombarding a target as defined in claim 12 in which the deuteride is the compound lithium deuteride.

15. The method of bombarding a target as defined in claim 12 in which the material including deuterium is a compound containing carbon.

References Cited
UNITED STATES PATENTS

| | | | |
|---|---|---|---|
| 917,191 | 4/1909 | Trivelli | 176—11 |
| 2,933,442 | 4/1960 | Lawrence et al. | 176—11 |
| 2,993,851 | 7/1961 | Thomson et al. | 176—11 X |
| 3,039,014 | 6/1962 | Chang | 176—4 |
| 3,071,525 | 1/1963 | Christofilos | 176—4 |
| 3,094,474 | 6/1963 | Gale | 176—11 |
| 3,212,974 | 10/1965 | Leboutet et al. | 176—5 |
| 3,230,145 | 1/1966 | Furth et al. | 176—5 |

REUBEN EPSTEIN, Primary Examiner

U.S. Cl. X.R.
250—84.5; 176—11